Jan. 23, 1962     R. O. HAWKES ET AL     3,017,997
ENDLESS BELT AND DRUM TYPE VACUUM FILTER
Filed March 21, 1960     2 Sheets-Sheet 1

Ralph O. Hawkes,
Harold G. Hawkes, Robert M. Morrison
& Oden R. Sirles
INVENTORS BY Watson, Cole, Grindle & Watson
ATTORNEYS Jan. 23, 1962 R. O. HAWKES ET AL 3,017,997
ENDLESS BELT AND DRUM TYPE VACUUM FILTER
Filed March 21, 1960 2 Sheets-Sheet 2
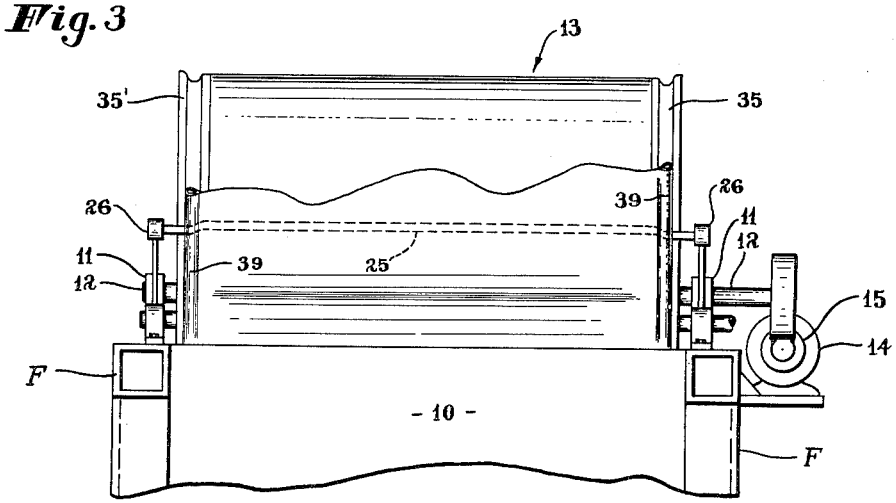
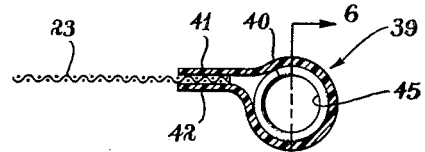
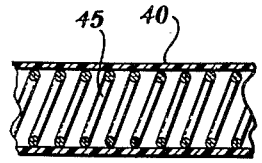
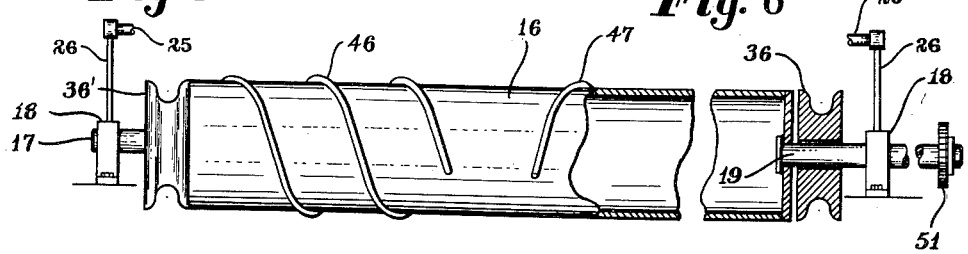
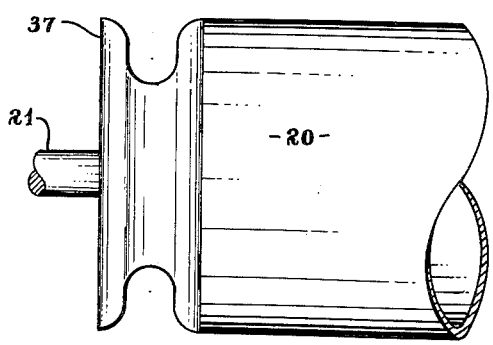
INVENTORS
Ralph O. Hawkes, Harold D. Hawkes,
Robert M. Morrison, & Adon R. Sirles
BY
Watson, Cole, Grindle &
Watson
ATTORNEYS 3,017,997
ENDLESS BELT AND DRUM TYPE VACUUM
FILTER
Ralph O. Hawkes, Harold G. Hawkes, and Robert M. Morrison, Arlington Heights, Ill., and Aden R. Sirles, Mendham, N.J., assignors to Komline-Sanderson Engineering Corporation, a corporation of New Jersey
Filed Mar. 21, 1960, Ser. No. 16,482
6 Claims. (Cl. 210—401)

This invention relates to improvements in an endless belt and drum type vacuum filter of the class in which filtrate is drawn through the filter belt as it passes around the drum by reduced pressure between the drum and the belt, the belt then moving from the drum over a discharge roll to remove the deposited filter cake.

In both the belt type vacuum filter unit, as above mentioned, and also in the more usual and conventional drum type of vacuum filter, the drum revolves slowly with its lower portion immersed in the liquid and solid mixture to be filtered. While the more conventional drum type of filter involves some difficulty in discharging the filter cake, since this can be done only by scrapers or washers, etc., with the risk of the filter cake being incompletely discharged, such a filter, up to the present time, has nevertheless possessed an inherent reliability in operation, which has made its use predominate over that of the belt type filter.

The belt type filter is able readily to overcome the aforementioned difficulty of discharging the filter cake by simply passing the endless filter belt around a discharge roll of comparatively small diameter, whereby the flexing of the belt may assist in breaking loose and freeing the filter cake, and this action may, if necessary, be supplemented by other instrumentalities. The discharge roll is normally to one side of the drum, and out of vertical registry with the tank of unfiltered liquids, so that there is no danger of the filter cake being returned into the tank.

However, an inherent difficulty in the operating of such endless belt filters as here involved consists in the difficulty of securing proper tracking of the filter belt around the filter drum and its associated roll or rolls. More specifically, there is usually a tendency for one edge of the filter belt to advance faster than the other with resulting axial displacement of the belt on the drum and the rolls. Also, due to the frequently thin and highly flexible nature of the filter belt, it has been difficult to maintain it spread laterally and in wrinkle free condition across the drum and its associated rollers in the direction of their axes.

Obviously, the uncovering of a portion of the suction area of the drum, whether through misalignment or wrinkling of the belt, or both, is adverse to successful operation, and will tend to permit drawing of unfiltered liquids into the drum and the mixing thereof with the filtrate. Also, wrinkling and general misalignment of the belt impose stresses thereon which result in rapid wear and formation of holes in it, all of which give rise to the same undesirable conditions above mentioned. In addition, where a doctor blade or scraper is employed to remove the filter cake from the belt, this will result in rapid wear and probable tearing of the belt in the event it contains any wrinkles which project above the remainder of the belt surface. Any of the above conditions will require additional shutdowns for belt repair or replacement, and in many industrial operations, this will involve an inordinate expense.

It has been known in the United States patent to Clark, No. 877,631, to provide the filter belt with hems along its edges, through which are disposed ropes which define tracking elements or ribs for reception in grooves formed in the filter drum and its associated rolls. In this arrangement, the belt is driven through its said tracking elements and, since the bottoms of their cooperating guide grooves are of lesser diameter than the drum and rolls proper, the resulting tendency of the edges to travel at a different velocity than the remainder of the filter belt may result in relative dislocation of different portions of the belt with attendant distortion and wrinkling.

In order to overcome this difficulty, in the present invention, the filter belt is driven through frictional engagement with one of its rotating supporting elements, such as the drum, and the tracking elements which move with the belt and are driven by it are so arranged and supported by their associated sheaves that they are free to move with and at the rate of speed of the belt proper despite differences of diameter between the sheaves and their respectively associated drum and rolls, and despite even slight differences in diameter as between axially aligned pairs of sheaves associated with either the drum or one of the rolls. Thus, differences in peripheral speeds of the sheaves, either with respect to each other or to the drum or their rolls, will not effect any difference in the rate of movement of the relatively opposed tracking elements, either with regard to each other or the belt.

It will be seen thus that, in accordance with one of the main inventive concepts here involved, the sole function of the several sheaves is to maintain these tracking elements at all times in their predetermined axial positions, without exerting any appreciable effect on their rates of movement.

It is furthermore contemplated in accordance with this invention that the tracking elements will function additionally as reinforcing and spring-tensioning means for the opposite side edges of the belt. Accordingly, it is a feature of the invention to provide a novel structure of the tracking elements, wherein same are capable of elastically tensioning themselves to support the edges of the belt without imparting or transmitting to the belt any stretching or contracting effect, such as might tend to create wrinkles or misalignment, thereby to decrease undesired sagging of the belt between the filter drum and discharge roll, and to better maintain the filter belt in sealing relation with the drum, especially along its edges.

Thus, in accordance with the invention, each tracking element preferably comprises a tubular sheath fixedly secured to its respective edge of the belt and normally of the same length as the belt, together with an elastic core, which may advantageously comprise a coil spring. The elastic core is normally of somewhat lesser length than the belt and sheath, before disposition around the sheaves, so that it is stretched and elastically maintains itself under tension when disposed around the respective sheaves. The core is disposed for lengthwise movement within its sheath, so that its stretching and contracting will not be transmitted to or opposed by the sheath. Moreover, this arrangement permits local creeping or relative stretching or movement of portions of the core within the sheath such as might occur incident to slight sagging of the belt between the drum and supporting rolls or incident to movement of the core and sheath around the drum and various rolls.

It is a further specific object to provide an improved structure of the discharge roll which functions to facilitate the freeing and discharging of the filter cake from the belt as it passes around this roll. This consists in the formation of spiral ribs projecting from the cylindrical roll surface and exerting or causing a series of continuous axially moving wave-like protrusions across the belt as the latter passes around the discharge roll, such protrusions serving to loosen and, in some cases, completely discharge the filter cake without necessity for other supplemental discharge means, such as scrapers or the like. Also, it is an important feature of the invention, considered from one aspect, to drive the belt from the drum at a predetermined peripheral speed, and to drive the discharge roll at a relatively greater peripheral speed or velocity to cause slippage thereof with respect to the belt, the spiral ribs being equally and oppositely pitched to cause lateral spreading of the belt.

It is a still further object to provide a stretchable cloth filter belt with a novel resilient edge structure, imparting elasticity to the belt as a whole, and permitting variation of the lengths of the paths pursued by the edges, all in the manner and for the purposes disclosed in the copending application of Thomas R. Komline and Aden R. Sirles, filed concurrently herewith, and of common ownership herewith.

In this application, we show and herein describe a specific embodiment of our invention, simply by way of exemplification of the preferred mode of carrying out our invention. Thus, referring to the appended drawings:

FIGURE 3 is a fragmentary front elevation of the structure shown in FIGURE 1;

FIGURE 5 is a transverse cross section through one edge of the filter belt structure and its associated tracking element;

FIGURE 6 is a section on the line 6—6 of FIGURE 5;

FIGURE 7 is a view, partly in elevation and partly in section, of the discharge roll and the supporting means; and FIGURE 8 is an enlarged fragmentary view of one end of the discharge roll.

Figure 1:
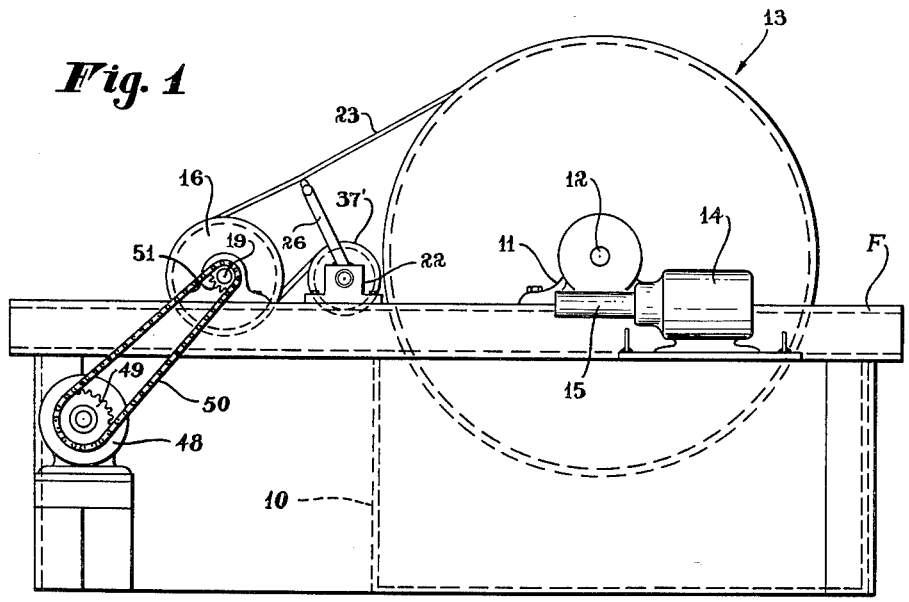
FIGURE 1 represents a side elevation of a filter unit incorporating the various features of the invention.

Referring now in detail to the accompanying drawings, and first considering the over-all organization of elements as depicted in FIGURES 1 and 3, there is provided a usual upwardly-opening tank or vat 10, which in accordance with usual practice will contain and continuously be supplied with a mixture of the liquid and solid matter to be subjected to the filtering operation.

Fixed on a rigid frame F adjacent to the end walls of the tank are suitable bearings, such as 11, in which are rotatably journaled the stub shafts or trunnions 12 of a cylindrical filtering drum 13. Normally the drum will be rotated at a constant, but relatively slow rotational speed as by means of a motor 14 transmitting its drive to the shaft 12 of the drum through a conventional enclosed worm gear drive 15.

Spaced horizontally from the drum 13 with its relatively far side projected outside of the tank 10 is a discharge roll 16, having axially projecting stub shafts 17 and 19, by means of which it is rotatably supported in usual fixedly supported bearings 18 on frame F. If desired, and in accordance with usual practice, there may be provided an additional roll in the form of a return roll 20, which is interposed between the drum 13 and the discharge roll 16 closely adjacent and in near tangency with the drum 13. This roll 20 may be supported by means of axially projecting stub shafts 21 at its opposite ends journaled respectively in bearings 22 supported on the frame F.

Disposed for movement in an endless circuit around the drum 13, discharge roll 16, and return roll 20 is a porous filter belt 23, which normally is driven by the drum and which may be formed of cloth fabric, or other suitable stretchable porous material in accordance with usual practice.

It has been found in filter units of the type here involved, that the upper run of the filter belt 23, between the drum 13 and roll 16, will normally tend to sag between its opposite edges, due both to its own weight and the added weight of the filter cake. As this sagging portion moves onto the roll 16, it may act to displace the medial portion of the belt in the direction of belt travel, with respect to the side edges and adjacent portions of the belt. It is therefore desirable to minimize this sag of the belt by a device such as the cloth support 25, consisting of a bar extending horizontally beneath the upper run of the belt, and having depending supporting legs 26—26 fixed to the housings of bearings 22.

Figure 2:
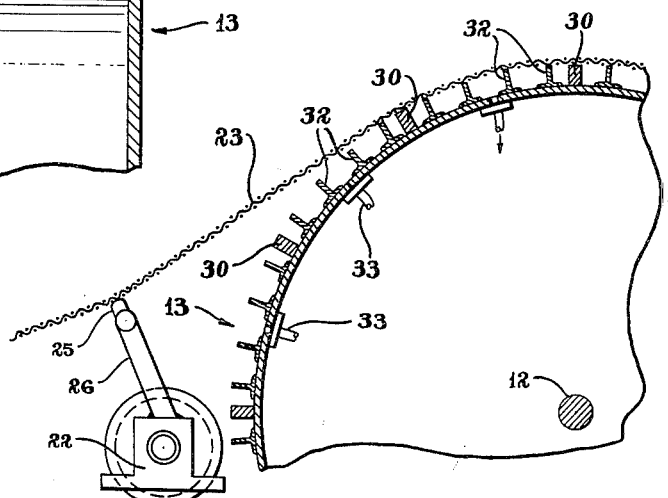
FIGURE 2 is a somewhat enlarged fragmentary radial section through a portion of the filter drum.

It will be understood that the drum proper 13 is of more-or-less conventional construction, consisting of a cylindrical shell of sheet metal or the like, supported by the trunnion shafts 12, as above mentioned. Disposed at regular intervals around the exterior of the drum are the usual axially extending sealing strips 30, which extend from end to end of the drum between the usual annular edge seals 31 (FIGURE 4) to define between the belt and the drum surface a plurality of relatively adjoining but isolated suction compartments. As is shown in FIGURE 2, a suction pipe such as 33 (shown fragmentarily) communicates with each such compartment. In accordance with usual practice, these suction pipes communicate with a conventional suction-producing source and the communication with such source is preferably disrupted by conventional valve means at the time any compartment is uncovered by movement of the belt therefrom toward the discharge roller and until it reaches a position of rotation wherein the open outer face of the drum is again covered by the belt. Between these sealing strips 30 there are preferably provided suitable foraminous deck-defining elements 32 of known construction, which serve simply to maintain the spacing between the filter belt 23 and the surface of the drum 13 whereby the suction may be more-or-less uniformly applied throughout the entire extent of each compartment.

Except as to the rollers 25 and their supporting structure, the general organization of elements thus far described and its over-all operation is conventional. Thus, the drive motor 14 transmits motion through the gear drive 15 to rotate the filter drum 13 at a constant relatively low speed, with the lower periphery of the drum and the filter belt thereon immersed in the mixture of liquid and solid to be filtered within the tank 10. The belt 23 is in frictional driven engagement with the drum through the filter deck 32 and sealing strips 30. As the belt passes around the discharge roll 36, it will be flexed, and the filter cake which has been formed thereon will be loosened and discharged.

Figure 4:
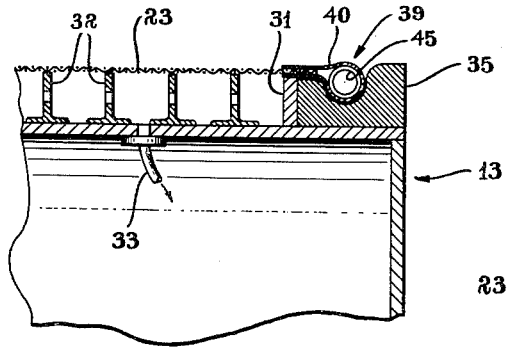
FIGURE 4 is a fragmentary diametrical section through the drum and its associated structure.

In order to ensure the accurate maintenance of the opposite edge portions of the filter belt 23 in predetermined paths of movement, or, in other words, for accurately ensuring the tracking of the belt 23 around the drum 13 and rollers 16 and 20, the drum and rollers may be provided respectively with suitable guide sheaves at their opposite axial ends for reception of and cooperation with tracking elements 39 on the opposite edge portions of the belt. Thus, the drum 13, as shown in FIGURES 3 and 4, has associated therewith at its opposite axial ends the relatively spaced and similar sheaves 35 and 35'. In the present embodiment, each of these sheaves 35 and 35' is formed simply as an annulus mounted on the cylindrical end portion of the drum 13 in the manner shown in FIGURE 4. Further guide sheaves 36, 36' are rotatably mounted on the stub shafts 17 and 19 at opposite ends of the roller 16 and preferably are free to rotate about the stub shafts independently of the roller 16 itself, which is fixed on the shafts by welding or otherwise, as will be apparent in FIGURE 7.

Further guide sheaves 37, 37' are mounted on the shafts 21 of the return roll 20 so closely adjacent the peripheries of the drum sheaves 35, 35' that the tracking elements 39 defined at the edges of the belt are simultaneously received and guided in the grooves of both pairs of sheaves 35–37 and 35'–37', and thus are positively confined against lateral dislocation. This insures correct axial positioning of the belt around the drum, and aligns the tracking elements of the belt with the guide sheaves 35, 35' of the drum. The guide sheaves 35, 36, and 37 will be disposed in a common plane parallel to the belt movement and on one side edge of the belt; whereas, the sheaves 35', 36', 37' will be similarly disposed in a common plane on the opposite side edge of the belt and parallel to its movement.

The tracking elements 39 on opposite sides of the belt 23 are of composite construction, each including a stretchable tubular sheath 40 secured along one edge portion of the belt and normally of the same length as the belt. Slidably housed for movement within the lengthwise of such tubular sheath is a resiliently stretchable core 45, normally of lesser length than the belt 23 and the respective sheaths 40, so that when the belt is operatively disposed around the drum and its rollers, the core 45 is resiliently stretched around the sheaves 35, 35', 36, 36' 37, 37', to provide tensioned supporting means for the belt, and particularly for the portion of the belt which, at any given time, is moving from the drum to the discharge roll 16 and supporting thereon the weight of the filter cake. Obviously the cores 45 impart resilient stretchability to the belt structure as a whole.

In one embodiment of the invention, as shown in FIGURES 4, 5 and 6, the tubular sheath 40 comprises an extruded polyethylene plastic tubular structure having integral and relatively parallel attaching flaps 41 and 42, respectively, between which is received one edge of the fabric belt structure 23. These flaps may be secured to the belt 23 in permanent manner, as by suitable waterproof cement or by sewing or other usual expedients.

The resiliently stretchable elastic core 45 is shown in the drawings, more particularly, in FIGURE 6, as consisting of a coil spring having closely-wound convolutions, whereby it may resiliently stretch and contract in usual manner. Such a spring may be formed of metal substantially as disclosed in United States patent of Thomas R. Komline, No. 2,699,260, granted January 11, 1955. ternately, it is contemplated that the core 45 may be formed as a coil spring of polyethylene plastic. However, it is not essential that the element 45 consist of a spring, as obviously it may comprise any suitable elastically stretchable band or element, without departing from the inventive concept herein. Similarly, it is not essential that the sheath 40 which houses the stretchable core 45 be of the particular structure above mentioned, or that it be formed of polyethylene plastic. Among other things, it is contemplated that such a sheath within the concept of the invention may be formed simply as an integral, marginal hem of reversely folded and stitched material on each side of the belt, as is illustrated in the United States patent to Clark, No. 877,361, of January 28, 1908. In either event, the sheath will normally be of the same length as the belt 23 itself and can stretch or yield with the belt as the latter is tensioned around its drum and several rollers, thus to avoid wrinkling of the belt. However, certain advantages arise where the sheath is of polyethylene construction, due largely to the characteristics of this material. For instance, due to the self-lubricating nature of the material and its normally smooth surface, it will be apparent that the resiliently stretchable core 45 will be free to move within and relative to the sheath 40 with somewhat less frictional resistance than would exist where the sheath is formed as a hem 40' of the same fabric as the filter belt 23. Moreover, the polyethylene sheath 40 will normally have greater wear resisting properties than the fabric, and thus there will be less likelihood of its wearing out, particularly at its points of contact with the respective sheaves above mentioned. However, it has been found that, in normal usage, the hem type of sheath has ample durability and is of simpler, more economical construction. It is therefore preferred for usage under normal conditions.

In accordance with the invention, the sheaves of each set 35, 36, 37 and 35', 36', 37', are arranged to permit substantially free movement of the tracking elements 39 with the belt 13 despite differences in effective diameter between the sheaves 35, 35', 36, 36', and 37, 37', and despite differences in diameter as between said sheaves and their respectively associated drum 13 and rolls 16 and 20. The desired freedom of movement may be attained in various ways. For instance, the annular grooves defined around the peripheries of the respective sheaves may be proportioned to slidably receive the respective tracking elements, so that these will move with the belt and not be dependent upon the peripheral speed of the sheaves. Or the sheaves 35 and 35' may be mounted for relative rotation on the cylindrical end portions of the drum 13, while the sheaves 36 and 36' and 37, 37' may be rotatably journaled on the shafts 18 and 21 of their respective rolls.

As a result of the foregoing arrangement, it will be apparent that the belt is driven from the drum through its frictional engagement therewith and the two sets of sheaves, 35, 36, 37 and 35', 36' and 37' function solely to accurately determine the axial or sidewise spacing between the belt tracking elements 39 without affecting their velocity, which is determined entirely by the movement of the belt proper.

In accordance with a further feature of the invention, it has been found possible to so construct the discharge roll 16 as to considerably facilitate the continuous freeing and discharging of the filter cake from the belt 23, as the latter passes around the discharge roll. To this end, and as shown in FIGURE 7, the discharge roll 16 is provided with one or more helical ribs, such as 46, 47, projecting radially outwardly from its cylindrical surface and disposed coaxially therearound. It is found that these ribs cause local protrusions or fold portions in the belt as it passes around the roll 16, and these tend to bend and thus break or crumble the filter cake as the belt 23 passes around the roll. By virtue of the spiral arrangement of these ribs 46, it will be seen that they tend to exert a series of continuous axially moving wave-like disturbances or protuberances, which function quite effectively to break loose the filter cake across the entire width of the belt 23, without leaving any relatively undisturbed areas on the belt.

Moreover, it has been found that, where there are two such yieldable ribs 46 and 47 of equal and opposite pitch disposed symmetrically on opposite sides of the drum 16, these may be utilized to serve the additional function of transversely smoothing and spreading or stretching the filter belt from its middle out toward its side edges, incident to passage of the belt around the roll 16. This result may be obtained by driving the drum or roll 16 at a greater peripheral speed than that of drum 13 with respect to the movement of the belt 23. This will result in slippage between the belt and the roll 16 and the oppositely pitched spiral ribs 46 and 47 will be wound in such direction around the roll with respect to the direction of this slippage between the roll and the belt that as an incident to this slippage, they will exert a lateral spreading action on the belt from its center portion out toward its edges.

In the preferred embodiment of the invention, such relative slippage is caused simply by driving the drum independently of, and at a greater peripheral speed than the drum, by an independent drive, exemplified by the motor 48 having a sprocket 49 on its output shaft connected by chain 50 to a sprocket 51 keyed on roll shaft 19.

In the over-all operation of the invention, therefore, it will be readily apparent that the several sheaves 35, 35', 36, 36', and 37, 37', function to guide the tracking elements at opposite edges of the belt in accurately predetermined laterally spaced paths, without materially affecting their speed of movement relative to each other or to the belt 13 proper, and that this speed of movement of both the belt and its tracking elements is determined simply by the frictional driving engagement between the driven roll or drum element and the belt proper.

Thus, the tracking elements 39 will cooperate with their respective sets of sheaves to maintain the accurate tracking of the belt at all times and to maintain it fully spread across the drum and rolls in substantially wrinkle-free condition. Moreover, the tubular sheaths 40 at the opposite edges of the belt are free to assume the same length as the belt, without causing wrinkling when the belt is tensioned. At the same time, the resiliently stretchable cores 45 may be tensioned or stretched around the same pulleys as the belt itself to properly support the belt without transmitting any expansion or contraction to the belt, such as might result in wrinkling, and to maintain the belt in intimate contact with the side seals 31 of the drum. Moreover, this novel arrangement of the sheaths and the resiliently stretchable cores disposed for movement therein readily permits any local creeping or relative movement of portions of the cores within the sheaves, such as is bound to occur incident to movement of the core and sheath around the rolls and the drum, all without imparting to the belt itself any local distortions tending to cause wrinkling.

It will be readily apparent that the invention, as above described, and as illustrated in the accompanying drawings, is capable of different and still further embodiments, and that its several details may be modified in various ways in addition to those specifically disclosed, all without departing from the invention, as defined in the accompanying claims. Accordingly, the foregoing drawings and description are not intended by way of limitation of the scope of the invention, but are merely illustrative in nature.

Having thus described our invention, we claim:

1. In an endless belt and drum type vacuum filter unit, a filter drum, means mounting said drum for rotation about a horizontal axis, annular edge seals on said drum, means for rotating said drum, annularly grooved guide sheaves of different diameters than said drum mounted for rotation coaxially with said drum, a discharge roll spaced horizontally from said drum, means supporting said roll for rotation about an axis parallel to the rotational axis of the drum, further guide sheaves of different diameters than said roll mounted for rotation coaxially to said roll adjacent its opposite ends, an endless porous filter belt disposed for movement in an endless circuit around said drum and said roll, relatively parallel tracking elements disposed along the opposite edges of said belt, and each guided for movement respectively around one of said first-mentioned sheaves and one of said further sheaves, said sheaves being arranged to permit substantially free movement of the tracking elements with the belt, despite differences in diameter between said sheaves and their respectively associated drum and roll, each said tracking element comprising a tubular sheath secured along one edge of the belt and normally of the same length as the belt, and a resiliently stretchable core of lesser length than the belt when the core is in repose and before its disposition around said sheaves, said core being slidably housed in the sheath and stretched around said sheaves to provide tensioned supports for said belt.

2. In an endless belt and drum type vacuum filter unit, a filter drum element, annular edge seals on said drum element, means mounting said drum element for rotation about a horizontal axis, annularly grooved guide sheaves of different effective diameters than said drum mounted for rotation coaxially with said drum element, a discharge roll element spaced horizontally from said drum element, means supporting said roll element for rotation about an axis parallel to the rotational axis of the drum element, further guide sheaves of different diameters than said roll element mounted for rotation coaxially to the said roll element adjacent its opposite ends, an endless porous filter belt disposed for movement in an endless circuit around both said elements, means rotating one said element to drive said belt through its circuit, relatively parallel tracking elements disposed along the opposite side edges of said belt, and each guided for movement respectively around one of said first-mentioned sheaves and one of said further sheaves, said sheaves being arranged to permit substantially free movement of the tracking elements with the belt, despite differences in diameter between said sheaves and their respectively associated drum and roll, each said tracking element comprising a tubular sheath secured along one edge of the belt and normally of the same length as the belt, and a resiliently stretchable core of lesser length than the belt when said core is in repose and before its disposition around said sheaves, said core being slidably housed in the sheath and stretched around said sheaves to provide tensioned supports for said belt.

3. In an endless belt and drum type vacuum filter unit, a filter drum, means mounting said drum for rotation about a horizontal axis, means for rotating said drum, guide sheaves mounted for rotation coaxially with said drum, a discharge roll of substantially smaller diameter than the drum spaced horizontally from said drum, means supporting said roll for rotation about an axis parallel to the rotational axis of the drum, further guide sheaves mounted for rotation coaxially to the said roll adjacent its opposite ends, an endless porous filter belt disposed for movement in an endless circuit around said drum and said roll, in driven engagement with said drum, relatively parallel tracking elements disposed along the opposite side edges of said belt, and each guided for movement respectively around one of said first-mentioned sheaves and one of said further sheaves, said sheaves being arranged to permit free movement of said tracking elements with said belt at the same peripheral speed as the belt, each said tracking element comprising a tubular sheath secured along one edge of the belt and normally of the same length as the belt, and a resiliently stretchable core of lesser length than the belt when said core is in repose and before its disposition around said sheaves, said core being slidably housed in the sheath and stretched around said sheaves to provide tensioned supports for said belt.

4. The combination of elements defined in claim 3, in which said sheaths comprise hems formed along opposite side edges of the filter belt.

5. The combination of elements defined in claim 3, in which each said sheath comprises a tube of polyethylene plastic secured to said belt.

6. In an endless belt and drum type vacuum filter unit, a filter drum, means mounting said drum for rotation about a horizontal axis, guide sheaves mounted for rotation coaxially with said drum, a discharge roll spaced horizontally from said drum, means supporting said roll for rotation about an axis parallel to the rotational axis of the drum, further guide sheaves mounted for rotation coaxially and relatively to the said roll adjacent its opposite ends, a porous filter belt disposed for movement in an endless circuit around said drum and said roll, relatively parallel tracking elements disposed along the opposite side edges of said belt, and each guided for movement respectively around one of said first-mentioned sheaves and one of said further sheaves, said sheaves being arranged to permit free movement of said tracking elements with said belt at the same peripheral speed as said belt, each said tracking element comprising a tubular sheath secured along one edge of the belt and normally of the same length as the belt, and a coil spring of lesser length than the belt when said core is in repose and before its disposition around said sheaves, said core being slidably housed in the sheath and stretched around said sheaves.

References Cited in the file of this patent

UNITED STATES PATENTS

| | | |
|---|---|---|
| 453,815 | Martin | June 9, 1891 |
| 660,027 | Proctor | Oct. 16, 1900 |
| 877,631 | Clark | Jan. 28, 1908 |
| 2,963,161 | Holland | Dec. 6, 1960 |